United States Patent

Roe

[15] 3,645,070
[45] Feb. 29, 1972

[54] GAS WASHER APPARATUS

[72] Inventor: Lewis P. Roe, 1342 Rosery Road, Clearwater, Fla. 33516

[22] Filed: July 7, 1970

[21] Appl. No.: 52,867

[52] U.S. Cl. ............................55/230, 55/236, 55/408, 55/459, 239/222.13, 261/79 A, 261/91
[51] Int. Cl. ...........................................B01d 50/00
[58] Field of Search .............................55/230, 92, 235–238, 55/240, 241, 459, 460, 406, 407, 408; 261/92, 91, 88–90, 79 A; 239/219, 222.13

[56] References Cited

UNITED STATES PATENTS

| | | | |
|---|---|---|---|
| 1,894,864 | 1/1933 | Hall | 261/91 |
| 2,001,817 | 5/1935 | Delling | 261/90 |
| 2,143,628 | 1/1939 | Lea | 261/91 |
| 2,213,881 | 9/1940 | Lauer | 55/223 |
| 2,419,905 | 4/1947 | Miess | 415/88 |
| 2,527,015 | 10/1950 | Lhota | 261/91 |
| 2,564,765 | 8/1951 | Mercier | 55/400 |
| 3,128,320 | 4/1964 | Umbricht | 261/89 |
| 2,122,334 | 6/1938 | Asbury | 261/91 |
| 2,273,341 | 2/1942 | Vollmer | 55/408 |
| 3,557,535 | 1/1971 | Howick | 55/237 |

*Primary Examiner*—Bernard Nozick
*Attorney*—Strauch, Nolan, Neale, Nies & Kurz

[57] ABSTRACT

A pollution control device including a lower contaminant collection chamber and an upper plenum chamber. A gas-washing system includes a rotating vertical hollow tube extending through the chambers and having its lower end submerged in a body of liquid provided at the bottom of the collection chamber. Within the collection chamber are a plurality of aspirating spray pipettes extending laterally from the hollow tube and a rotor assembly mounted on the hollow tube just above the pipettes with part of the rotor assembly forming a seal between the upper and lower chambers which forces the gas to flow through the main rotor section in order to pass from the lower to the upper chamber. A plurality of deflectors are mounted adjacent the nozzle ends of the pipettes to diffuse the water emitter from the nozzles into an annular water shroud or spray. This water is deposited on particles deflected by the main rotor section, thereby effectively increasing the mass of the particles and causing them to collect by centrifugal action against the walls of the collection chamber. A fan mounted on the hollow tube in the upper chamber draws cleaned air from the rotor assembly and passes it out to the surrounding atmosphere.

12 Claims, 6 Drawing Figures

INVENTOR.
LEWIS P. ROE

INVENTOR.
LEWIS P. ROE
BY
*Strauch, Nolan, Neale, Nixon & Kurz*
ATTORNEYS

INVENTOR.
LEWIS P. ROE

GAS WASHER APPARATUS

BACKGROUND OF THE INVENTION

This invention relates to air pollution control devices and more particularly to a novel air pollution control device in which particles of contaminant matter in a gas, such as air, are removed from the gas by washing it with a fluid such as water.

Today, more and more emphasis is being placed upon the control of air pollution and the elimination of contaminants from the atmosphere. The air pollution problem is particularly acute in heavily industrialized and densely populated regions. For example, chemical and metal refining industries, foundries, metal manufacturing industries, and such, which have a large amount of waste gases either in the form of consumed gases or ventilating gases contribute extensively to air pollution. Unless these gases are treated adequately before being released into the atmosphere, human beings may be subjected to dangerous and hazardous health conditions and the value of property, both personal and real, may be adversely affected.

In the past, pollution control devices of the type with which the invention is concerned have been used with some degree of success. However, as governmental agencies establish more rigid and stricter pollution standards for gases exhausted into the atmosphere, the need for more efficient, higher quality air pollution control devices has become acute and has led to the development of the invention described and claimed herein.

SUMMARY OF THE INVENTION

Accordingly, a primary object of this invention resides in the provision of a novel improved air pollution control device in which the contaminated gas is forced to flow through a gas cleaning and washing assembly which effectively removes the contaminated particles, including the lighter particles, from the gas before it is exhausted to the atmosphere.

Another object resides in the provision of a novel air pollution control device in which the contaminated gas is passed through a lower particle collection chamber into an upper plenum chamber via a particle removal gas cleaning assembly. The gas-cleaning assembly includes a rotating vertical hollow tube or shaft and a plurality of horizontal spray pipettes or nozzles mounted on the tube, with a plurality of deflectors or diffusers mounted adjacent the rotational path of the nozzles to diffuse the water jets emitted from the nozzles to form an annular shroud or spray of water. A rotor is mounted on the tub above the spray nozzles and includes a plurality of spaced vertically inclined bars through which the gas must pass on the way to the upper plenum chamber. The bars function to deflect any particles in the gas down into the shroud of water to cause the particles to become water laden and hence increase in mass until, by centrifugal force, they are collected at the wall of the collection chamber.

Still another object resides in the provision of an air pollution control device as in the above objects wherein the gas is introduced tangentially into the lower collection chamber and caused to rotate in the same direction of rotational as the hollow tube, rotor, and spray nozzles. A gas seal is formed between the upper and lower chambers and forces the gas to flow through the rotor in order to pass from the lower to the upper chamber. A fan in the upper chamber assists removal of the clean gas from the upper chamber and prevents any back pressure buildup in the lower chamber.

A further object resides in the provision of an air pollution control device according to the previous objects wherein the rotor bars are equally spaced apart a distance substantially equal to the diameter of each bar so that any particles in the gas will be deflected by a bar or bars back into the annular water shroud and the cleaned gas will pass between the bars and up into the upper plenum chamber.

Other objects and advantages will become apparent from reading the following detailed description of a preferred embodiment of the invention with reference to the accompanying drawings in which like numerals indicate like elements.

DETAILED DESCRIPTION OF THE INVENTION

Figure 1:
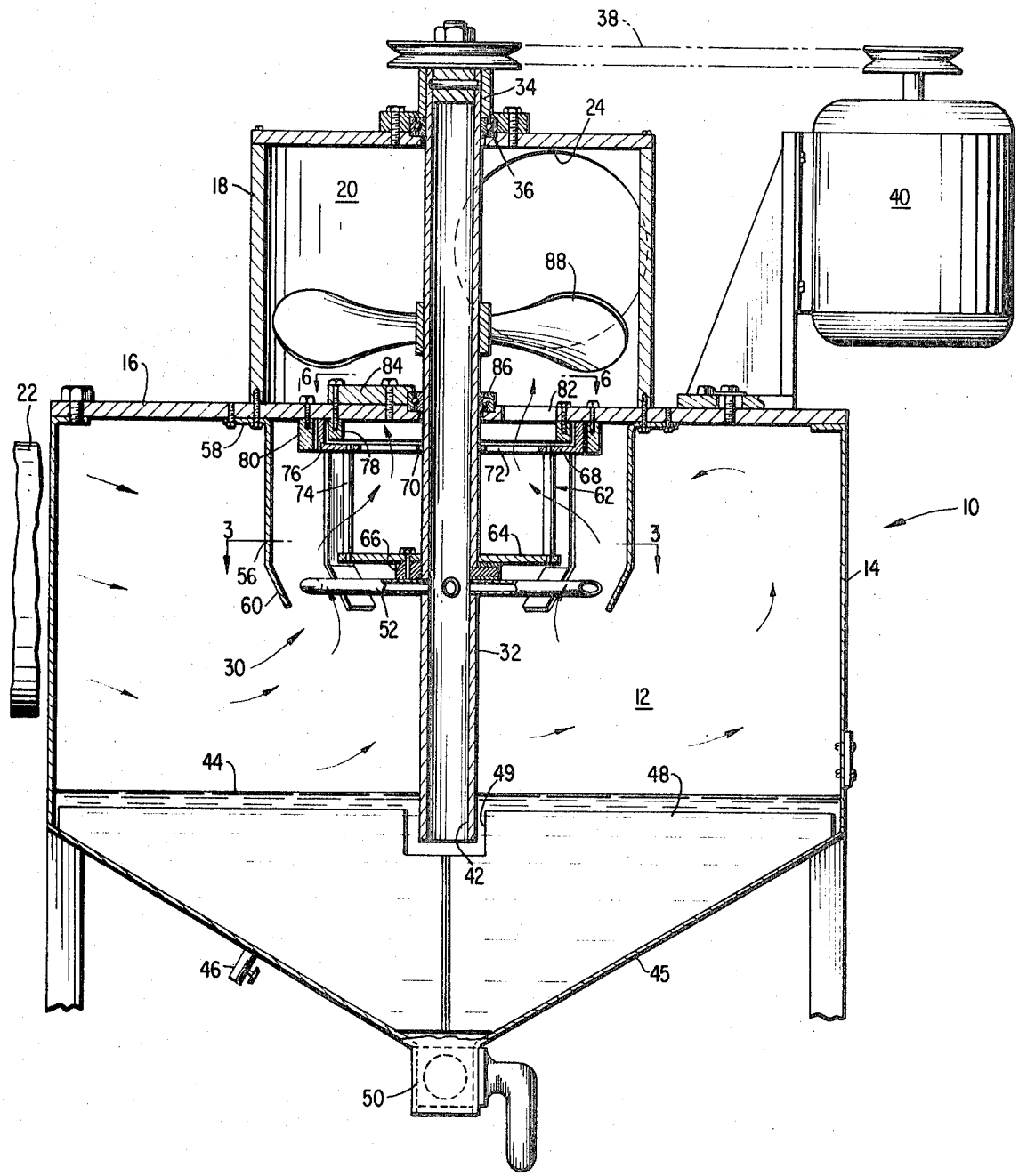
FIG. 1 is a fragmentary sectional elevation view illustrating the novel air pollution control device of the invention.
Figure 2:
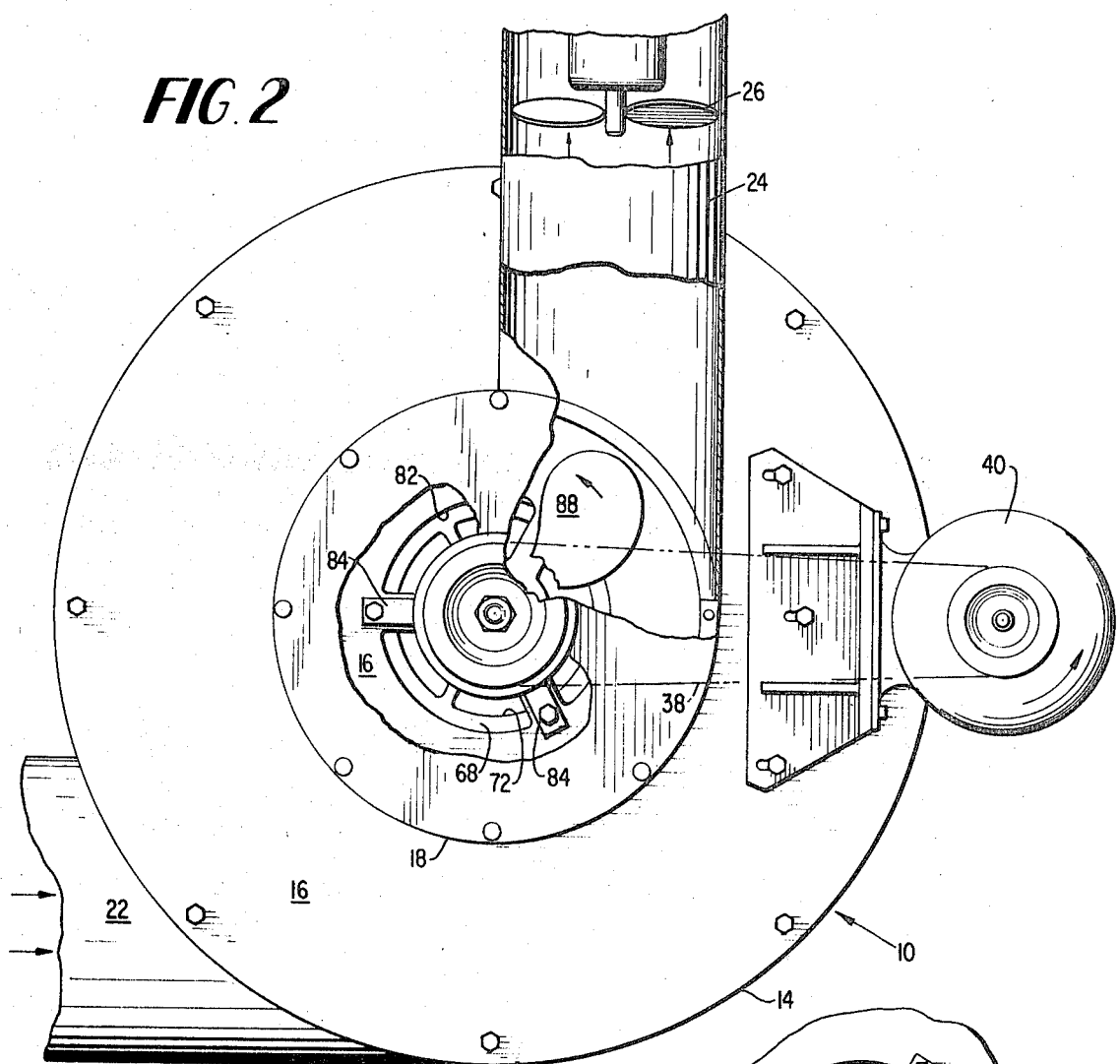
FIG. 2 is a fragmentary plan view of the air pollution control device shown in FIG. 1.

Referring more to FIGS. 1 and 2, the novel air pollution control device 10 of the invention comprises a lower contaminant particle collection chamber 12 formed by a cylindrical housing 14 having a cover plate 16 on which a smaller upper housing 18 is supported to provide an upper plenum chamber 20. Lower housing 14 has a tangential inlet 22 for introducing dirty gas into chamber 12 in a swirling fashion to cause the heavy particles to collect by centrifugal force against the wall of housing 14.

Similarly, upper housing 18 has a tangential outlet 24 for discharging clean gas from plenum chamber 20. A suction fan 26 may be positioned in outlet 24 to assist in the discharge.

The particle collection chamber 12 communicates with the plenum chamber 20 through the intermediary of a novel gas cleaning and washing assembly 30 which forms a primary part of the invention. Assembly 30 comprises a vertical hollow tube or shaft 32 rotatably mounted at its upper closed end 34 by a thrust bearing 36 in the top of upper housing 18 and driven through a pulley drive 38 by a suitable motor 40 supported on cover plate 16.

Tube 32 extends downwardly through chamber 20, the center portion of plate 16, and chamber 12 and has its lower open end 42 submerged below the liquid level of a reservoir of a suitable liquid such as water 44 provided in the conical bottom section 45 of chamber 12 via inlet pipe 46.

A nonsurge or noncirculating baffle 48 is positioned across conical section 45 within reservoir 44 to prevent circulation of the water and enhance the collection of particles in section 45. Baffle 48 has a central recess 49 in which tubular end 42 is received. The cleanout discharge valve 59 permits periodic removal of the sedimentary particles from chamber 12.

A plurality of aspirating tubular pipettes 52 extends horizontally from tube 32 and each pipette has its open nozzle end 54 cut at a 45° angle to provide a nozzle opening facing in a direction opposite to the direction of rotation of tube 32 and the pipettes.

A plurality of water deflectors or diffusers 56 are provided around the circular path of travel of pipettes 52, with each diffuser being connected at its upper end 58 to cover plate 16 and having its lower end 60 bent inwardly. As tube 32 is rotated, an aspirating or suction effect is created at the nozzle ends 54 of pipettes 52 and water is sucked upwardly through tube end 42 and passed outwardly through the pipettes. The water emitted from nozzle ends 54 will impinge upon deflector ends 60 and be diffused to form an annular shroud or mist or water.

Figure 5:
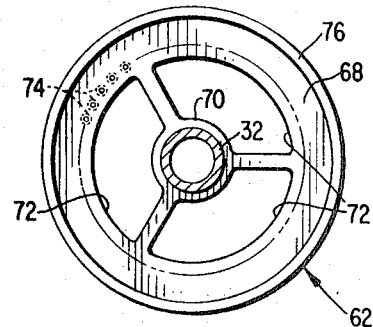
FIG. 5 is a top view of the rotor taken along line 5—5 of FIG. 4.
Figure 4:
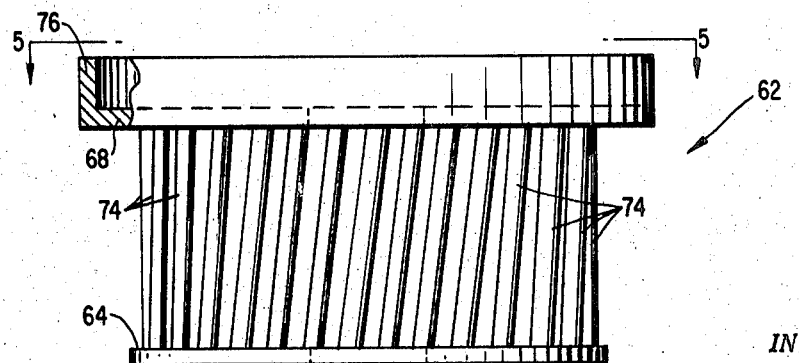
FIG. 4 is a partially sectional elevation view of the rotor alone.

A squirrel cage rotor 62 is also connected to tube 32 immediately above pipettes 52. As shown best in FIGS. 1, 4, 5, rotor 62 includes a solid circular lower plate 64 mounted on tube 32 via hub 66, an upper spider plate 68 mounted on tube 32 via hub section 70 and having openings 72, and a plurality of inclined circular, equal sized bars 74 extending between plates 64 and 68, with adjacent bars being spaced from each other a distance substantially equal to the diameter of each bar. Bars 74 are inclined in the direction of rotation of tube 32 and rotor assembly 62.

The outer peripheral edge of spider plate 68 has an upward annular flange 76 which rotates between inner and outer concentric rings 78 and 80, respectively, that are supported from cover plate 16. The construction provides a seal or trap between chambers 12 and 20 and forces the gas to pass through rotor 62.

Figure 6:
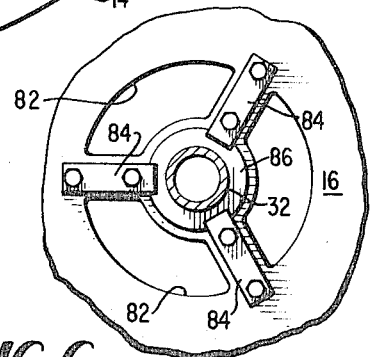
FIG. 6 is a fragmentary section view taken along line 6—6 of FIG. 1.
Figure 3:
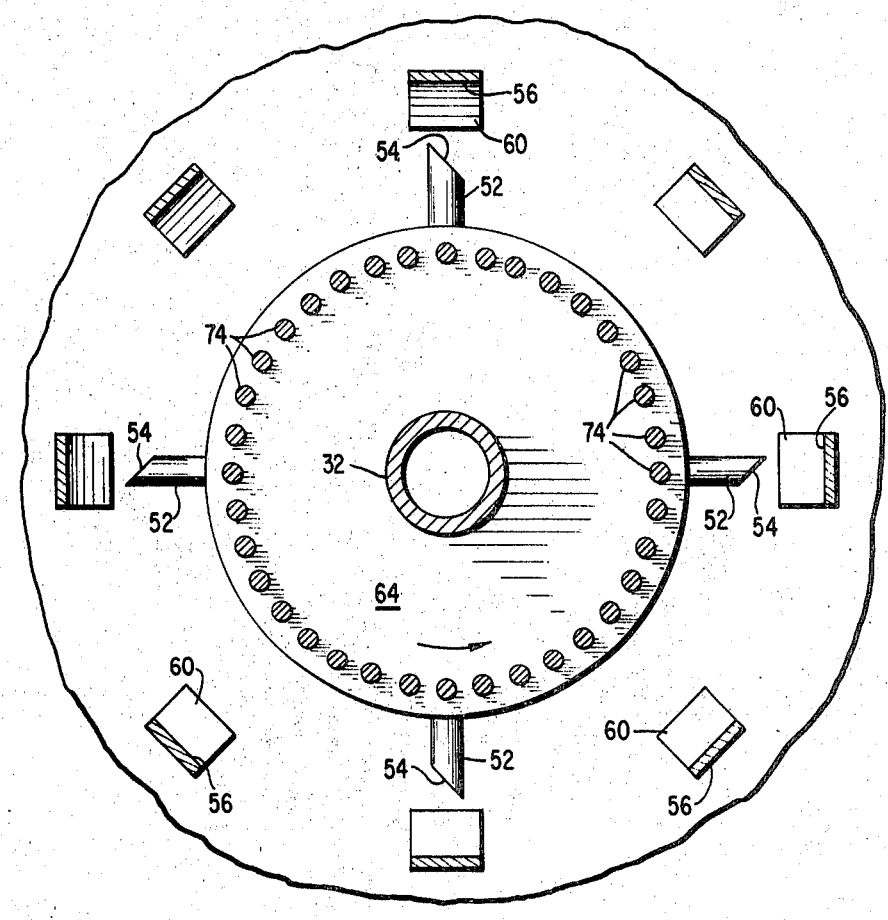
FIG. 3 is a fragmentary sectional view taken along line 3—3 of FIG. 1.

As shown in FIGS. 1 and 6, the central portion of cover plate 16 is spider shaped to provide openings 82 which communicate with openings 72 of rotor 62 to pass clean air into plenum chamber 20. A plurality of clamps 84 are positioned on cover plate 16 and clamp a bearing 86 in supporting engagement with tube 32 as it passes through cover 16.

A helical blade fan 88 is mounted on tube 32 within plenum chamber 20 and functions to draw clean gas upwardly through openings 72 and 82, thereby reducing the amount of back pressure in chamber 12.

In operation, dirty air is introduced into chamber 12 through tangential inlet 22 and caused to rotate in the direction of rotation of shaft 32, pipettes 52, rotor assembly 62, and fan 88. Initially the heavier contaminant particles will collect against the wall of housing 14 and fall down into conical section 45.

As shaft 32 rotates, water is drawn up through tube end 42 and emitted from nozzle ends 54 in the form of jets which impinge upon the lower ends 60 of water deflectors 56. The water jets are deflected upwardly by deflector ends 60 to form an annular water shroud or spray surrounding primarily the lower portion of rotor 62.

Since the gas is moving in a cyclonic fashion in chamber 12, the lighter particles tend to collect in the central low velocity region of the gas, and as the gas is drawn through rotor 62, these lighter particles will be deflected by bars 74 back into the water shroud surrounding the rotor. The particles will then become water laden and effectively increase in mass until they are sufficiently heavy to be thrown by centrifugal force against the wall of housing 14.

The spacing between and the inclination of bars 74 as described above have been found to be critical, that is, the spacing and inclination of the bars is important to obtain optimum operating efficiency and performance of the device. By spacing the circular bars a distance substantially equal to the diameter of the bars, the angle of incidence for each particle as it strikes a bar approximately equals the angle of reflection, thereby ensuring that any lighter particles in the dirty gas entering rotor 62 are deflected by one bar either to an adjacent bar or back into the water shroud, and not into the interior of the rotor. By inclining bars 74 toward the direction of rotation of shaft 32, the lighter particles are deflected downwardly into the water shroud formed by pipettes 52 and deflectors 60 to become water laden and subsequently although the described spatial and inclined arrangement of bars 74 produces optimum performance of the device, it is to be understood that the arrangement is not essential to operation of the device at a lesser efficiency which might be acceptable for some applications, depending upon the condition of the air which is to be treated. In other words, the scope of the invention is not to be limited by the above-described bar arrangement which merely represents the ideal condition, but is not essential to the broad aspects of the device of the invention separated from the gas by centrifugal action.

The trap or seal formed between chambers 12 and 20 by rotating flange 76 and stationary rings 78 and 80 prevents any gas from bypassing bars 74 and forces the gas to pass through the rotor before it enters plenum chamber 20. In this way, any particles entrained in the gas will be deflected by the bars back into the water shroud and be removed as described above.

Rotor 62 also promotes removal of particles from the gas by effectively changing the direction of flow of the gases at the center of the vortex at which the gas velocity is essentially zero. The direction of movement is changed from rotational to generally vertical after which the clean gas is drawn through rotor openings 72 and cover openings 82 by fan 88 and subsequently discharged through tangential outlet 24.

Throughout the operation, the fluid 44 may be continuously circulated and filtered to remove collected particles, or alternatively clean fluid may be periodically introduced through conduit 46 into chamber 12 and collected particles periodically removed through valve 50.

In addition, the amount of water lifted through shaft 32 and converted into a water shroud or spray may be varied as needed by varying the speed of rotation of the shaft and pipettes 52, and varying the diameter of shaft 32 and/or the length and diameter of pipettes 52.

It should be noted that by closing the upper end of shaft 32 as shown, a buffer of compressed air collects above the rising water in shaft 32 and this affords a more steady, surge-free flow of water into pipettes 52 and out through nozzle ends 54. Also, a steady flow of water is enhanced by having the opening of inclined nozzle end 54 facing in a direction opposite the direction of rotation of the shaft and pipettes.

Furthermore, any number of water deflectors 56 may be provided depending upon the volume and condition of gas being treated and the amount of water spray or mist required for efficient operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Gas-cleaning apparatus for controlling air pollution comprising means defining a particle collection chamber having an annular sidewall, means for introducing contaminated gas substantially tangentially into said chamber whereby heavier particles in the gas are displaced outwardly toward said wall by centrifugal force and lighter particles tend to continue with the gas toward a central region of said chamber, outlet means connected to said chamber-defining means for withdrawing gas from said central region, means mounted in said chamber at said central region for separating lighter particles from said gas comprising continuously rotated rotor means having a plurality of circumferentially spaced bars arranged around its axis of rotation for intercepting particles in said gas and deflecting them into said collection chamber outwardly of said central region as gas flows between said bars, sealing means between said outlet means and said collection chamber for preventing gas from leaving said collection chamber without passing through said rotor means, means providing a liquid spray in said chamber outwardly of said rotor means in the path of said particles deflected by said rotor means comprising a plurality of radially extending spray nozzles connected to and rotatable with said rotor means, and a plurality of annularly spaced stationary deflection members mounted in said collection chamber adjacent said spray nozzles in the path of liquid discharged from said nozzles and so constructed and arranged to deflect the liquid to form a substantially annular liquid spray around said rotor means.

2. In the apparatus defined in claim 1, said nozzles being disposed below said rotor means.

3. In the apparatus defined in claim 1, said rotor bars being inclined in the direction of rotation of said rotor means.

4. In the apparatus defined in claim 1, said rotor bars being of substantially circular cross section and of similar diameter, and adjacent bars being circumferentially spaced in the rotor means by an amount equal substantially to the rotor bar diameter.

5. In the apparatus defined in claim 1, means for selectively extracting separated particles from the bottom of said collection chamber.

6. In the apparatus defined in claim 1, said collection chamber having an upper transverse wall formed with an outlet opening, said rotor means being disposed at the underside of said upper wall, and said sealing means comprising cooperating annular means on said upper wall and said rotor disposed in surrounding relation to said upper wall opening.

7. In the apparatus defined in claim 6, said sealing means comprising means defining a downwardly open annular channel on the underside of said wall and an annular rim on the rotor means fitting relatively rotatably into said channel.

8. In the apparatus defined in claim 6, means defining a plenum chamber above said upper wall opening, and said shaft means extending rotatably through said upper wall and mounting a fan in said plenum chamber for withdrawing gas from said central region through said upper wall opening, and a discharge outlet for said plenum chamber.

9. In the apparatus defined in claim 1, a reservoir of said liquid in the lower part of said collection chamber, said rotor means comprising hollow shaft means having a lower end disposed in said reservoir and said nozzles projecting from said shaft means to terminate in open outer ends disposed beyond said rotor bars.

10. In the apparatus defined in claim 9, said rotor bars being positioned above said nozzles on said shaft means and said rotor bars being inclined from bottom to top in the direction of rotation of said shaft means so that particles will be deflected downwardly into said liquid spray, whereby said particles will become laden with said liquid to effectively increase in mass so that they may be separated from said gas by centrifugal forces in said collection chamber.

11. In the apparatus defined in claim 9, said nozzles being tubes having angled outer ends providing nozzle openings facing opposite to the direction of rotation of said rotor means.

12. In the apparatus defined in claim 11, said nozzle outer ends being angled at about 45° to the nozzle axes.

* * * * *